UNITED STATES PATENT OFFICE.

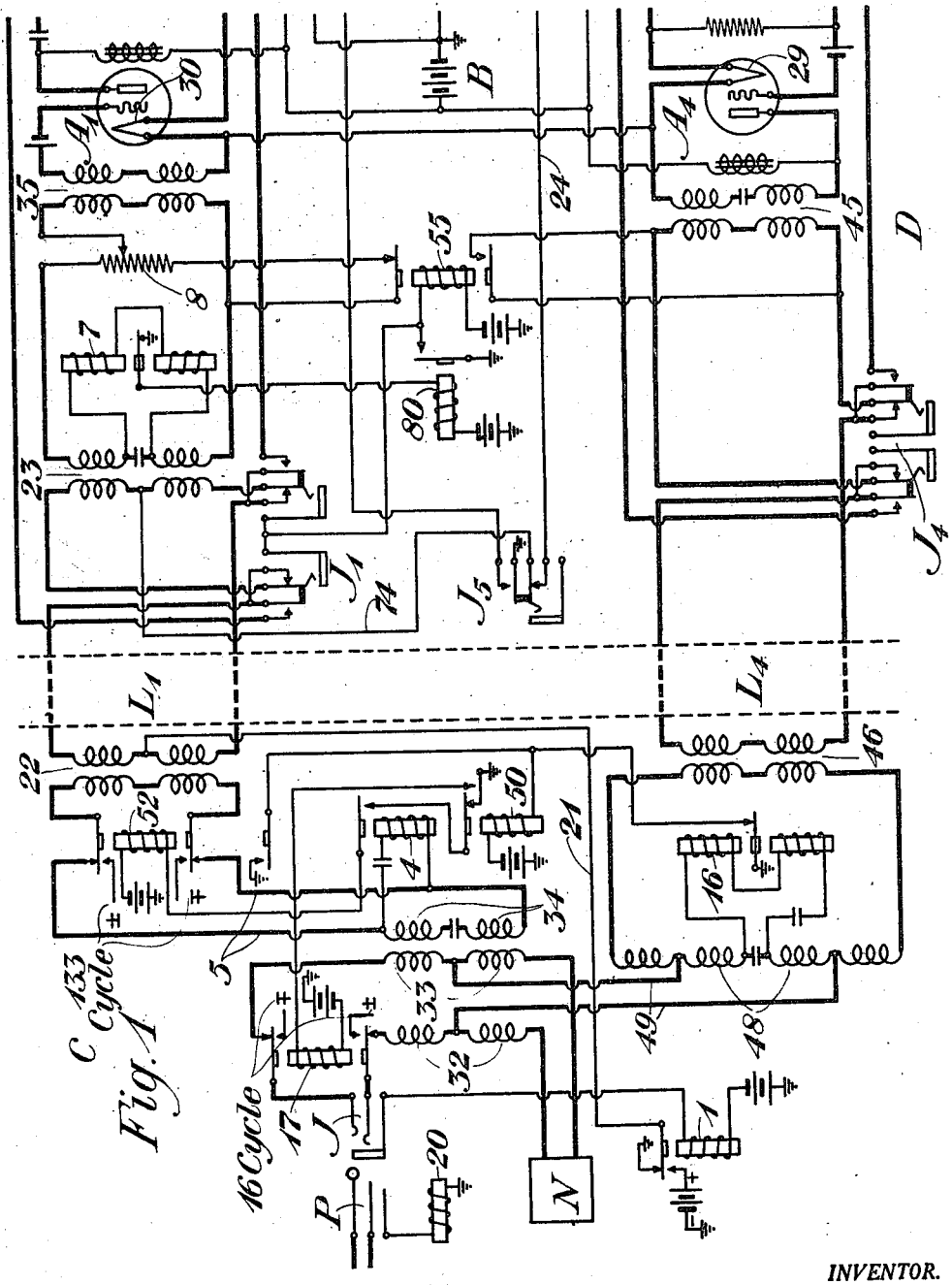

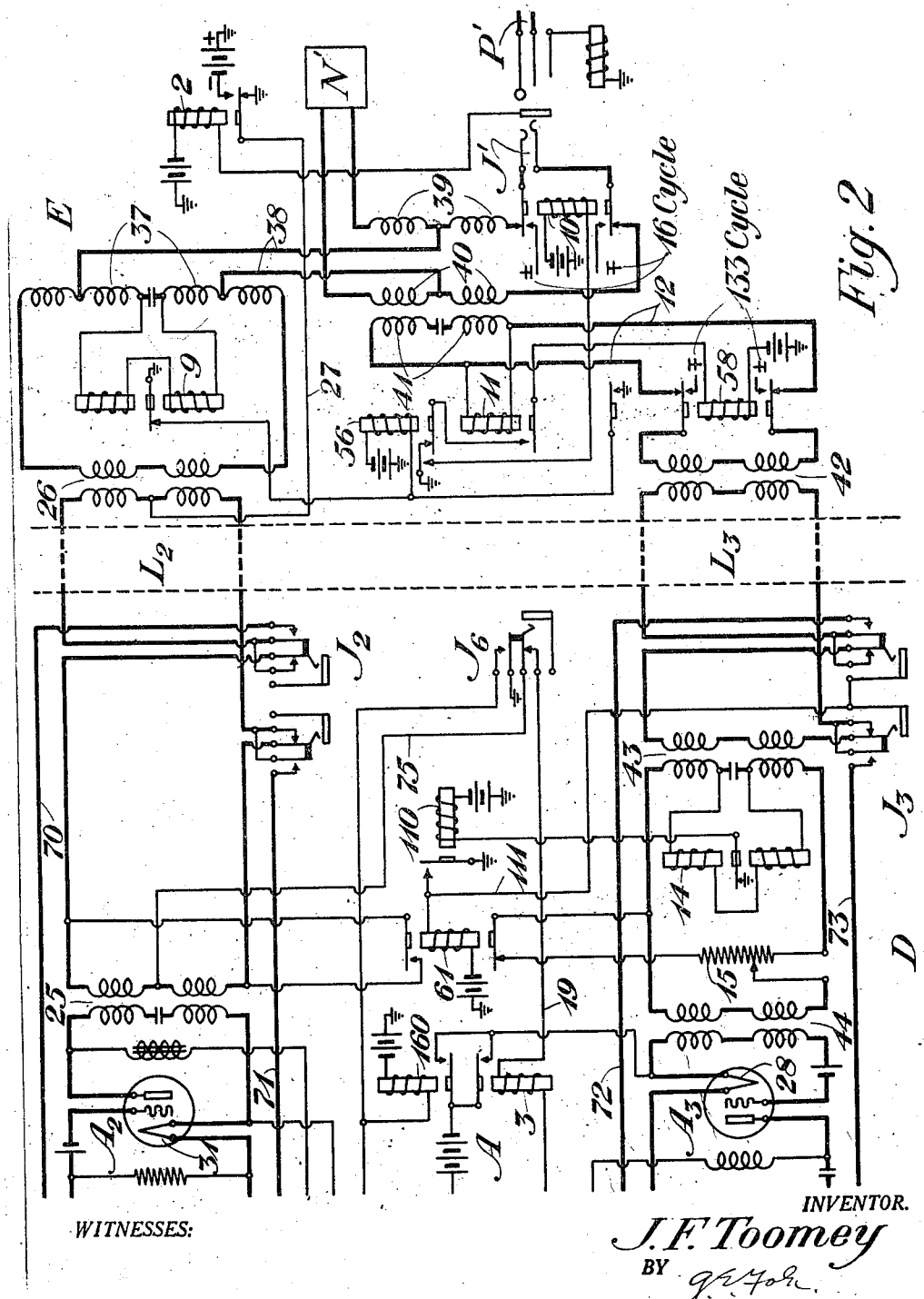

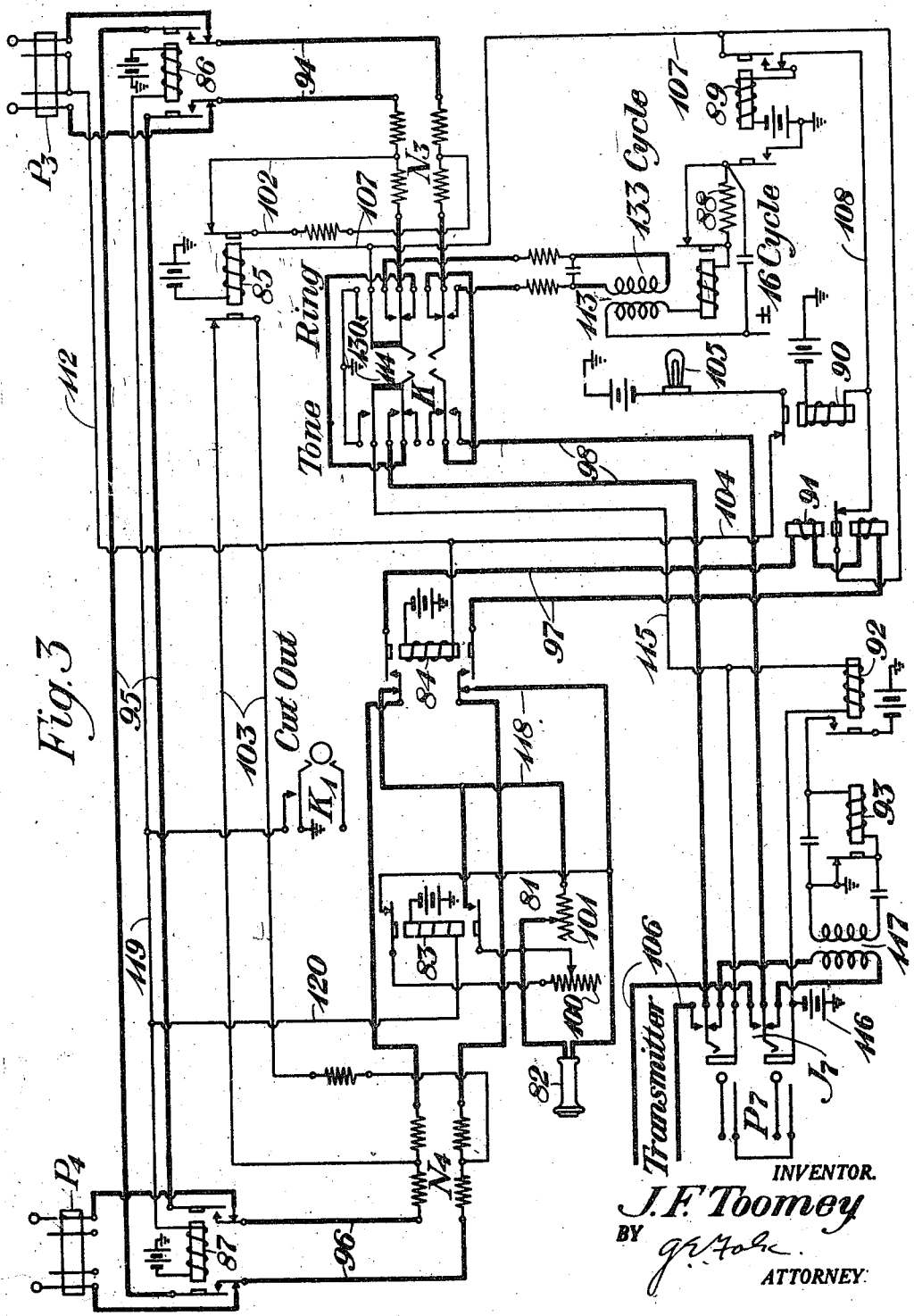

JOHN F. TOOMEY, OF NEW YORK, N. Y., ASSIGNOR TO AMERICAN TELEPHONE AND TELEGRAPH COMPANY, A CORPORATION OF NEW YORK.

TESTING APPARATUS FOR FOUR-WIRE REPEATER-CIRCUITS.

1,295,816.  Specification of Letters Patent.  Patented Feb. 25, 1919.

Application filed October 16, 1917. Serial No. 196,897.

*To all whom it may concern:*

Be it known that I, JOHN F. TOOMEY, residing at New York, in the county of New York and State of New York, have invented certain Improvements in Testing Apparatus for Four-Wire Repeater-Circuits, of which the following is a specification.

This invention relates to apparatus for testing repeater circuits and more particularly to apparatus for testing repeater circuits of the type known as four wire repeater circuits. The invention has for one of its objects the provision of means whereby apparatus at a repeater station may be tested with respect to its operation in transmitting speech. Another object of the invention has reference to the provision of means for testing the operation of the apparatus of repeater stations with respect to their transmission of ringing current. A further object of the invention is the provision of means whereby transmission may take place through the repeater station when the repeater has been disconnected for testing purposes. Other and further objects of the invention will be clear from the detailed description to be given later.

In the usual four wire repeater circuit used for telephone transmission two stations distant from one another are interconnected by a pair of transmission lines, one for transmission in each direction, one way repeaters being inserted in the lines at an intermediate station or stations to amplify the currents transmitted over the circuit. It is found desirable to test the repeaters at the intermediate stations to ascertain the gain in transmission due to the amplifiers with respect to speech currents and also to test the operation of the amplifiers with respect to ringing currents. It is also found desirable that, while the repeaters are connected to the testing apparatus, transmission should take place through the intermediate station. Consequently jacks are provided at the intermediate station which, when operated to connect the repeater to the testing set, also serve to disconnect it from the corresponding transmission line and in its place interconnect the sections of said line through auxiliary conductors. When the repeater is connected to the testing set by the aforementioned jacks means are provided under the control of suitable keys whereby either telephonic currents or ringing currents may be passed through the repeater and apparatus associated therewith, so that the effects of such currents upon suitable indicating mechanisms in the testing set may thereby be observed.

The invention may now be fully understood from the following description taken in connection with the accompanying drawing in which Figures 1 and 2 when placed side by side with Fig. 3 placed below constitute a circuit diagram of the arrangements of the invention. Referring to Figs. 1 and 2 of the drawing, stations C, D and E are shown, stations C and E being two terminal stations connected by a four wire circuit consisting of two separate transmission lines, each line being used for transmission in one direction only. For instance, transmission from stations C to E takes place over the lines $L_1$ and $L_2$, while transmission from E to C takes place over lines $L_3$ and $L_4$. At station D intermediate between stations C and E, an amplifying arrangement consisting of one way repeaters for each transmission line is provided. The amplifying arrangement between lines $L_1$ and $L_2$ consists of a pair of tandem amplifiers $A_1$ and $A_2$ of the well known vacuum tube type, although it will be understood that any other suitable type of amplifier may be employed. Similarly between lines $L_3$ and $L_4$ vacuum tube amplifiers $A_3$ and $A_4$ are arranged in tandem. These amplifiers are all illustrated as at station D. It will be understood, however, that if desired a plurality of intermediate stations may be arranged between the terminal stations C and E, each intermediate station being provided with amplifying arrangements similar to those illustrated at station D. In order to connect the testing apparatus illustrated in Fig. 3 with the amplifying arrangements of station D, jacks $J_1$, $J_2$, $J_3$ and $J_4$ are provided. If it is desired to test the amplifying arrangements of station D with respect to the transmission of speech or ringing currents transmitted from station C to station E, plug $P_3$ is inserted in jack $J_1$ and plug $P_4$ is inserted in jack $J_2$. In testing transmission from station E to station C plug $P_4$ is inserted into jack $J_4$ and plug $P_3$ is inserted into jack $J_3$.

The insertion of plugs $P_3$ and $P_4$ into either jacks $J_3$ and $J_4$ or jacks $J_1$ and $J_2$, in addition to connecting the amplifiers $A_3$ and $A_4$ or $A_1$ and $A_2$ to the testing apparatus, serves to disconnect these amplifiers from the transmission lines or cut them out of service and allows transmission to take place directly between the transmission lines over conductors 70 and 71 or 72 and 73.

At each terminal station C and E the four wire circuit is coupled through a three winding transformer to a two wire connection terminating in jacks J and J', whereby the four wire circuit may be connected to terminating two wire lines outgoing from stations C and E. The terminating two wire lines are not illustrated, however, but plugs P and P' of suitable cord circuits for connecting the four wire circuits to the terminating two wire lines are shown coöperating with jacks J and J'. Artificial lines N and N' are provided at stations C and E respectively to balance the particular terminating two wire lines with which the four wire circuit is connected.

In order that the operators at stations C and E may have control of the amplifying arrangement at station D, simplex circuits are provided, said simplex circuits being under the control of sleeve relays 1 and 2 of the terminating jacks of the four wire circuit. The simplex circuit extends from the contact of relay 1, over conductor 21 to the midpoint of the secondary winding of transformer 22, thence over the two sides of line $L_1$ in parallel to the mid-point of the primary winding of transformer 23, thence over conductors 74 and 24 through the winding of an amplifier controlling relay 3, over conductors 19 and 75 to the mid-point of the secondary winding of transformer 25, thence over the two sides of line $L_2$ in parallel to the mid-point of the primary winding of transformer 26 and over conductor 27 to the contact of sleeve relay 2. This circuit is so arranged that upon the energization of either relay 1 or relay 2, or both, the simplex circuit is closed to energize the amplifier controlling relay 3 which operates to close the circuit of the filaments of the amplifiers, thereby rendering them operative.

In order to provide for through ringing over the four wire circuit from station C to station E a relay 4 responsive to 16 cycle ringing current coming in from a terminating two wire line is bridged across the output circuit 5 of the four wire repeater arrangement. This ringing relay 4 operates to control the action of relay 52 which when energized attracts its armatures to open circuit 5 and to connect a local source of 133 cycle ringing current to line $L_1$. 133 cycle ringing current is applied at station C instead of 16 cycle ringing current for the reason that the former frequency is better adapted to the type of transmission circuit provided by the lines $L_1$ and $L_2$. It will be understood, that subject to conditions met in practice, the frequency of the ringing currents used may be varied as desired or found necessary in different situations.

At the station D the ringing current transmitted over the line $L_1$ actuates a suitable ringing responsive relay 7 which breaks the circuit through the normally energized relay 80 and causes its armature to retract and close a circuit through relay 55, thus energizing relay 55. The energization of relay 55 opens the circuit of a portion of a potentiometer 8 which is in shunt of the input circuit leading to the amplifier $A_1$, while at the same time it shortcircuits the induction coil 45 connecting the output circuit of amplifier $A_4$ with the line $L_4$. The opening of the shunt portion of the potentiometer 8 serves the purpose of increasing the amplification of the amplifiers $A_1$ and $A_2$ so as to secure the desired amplification for ringing current. The ringing current is then transmitted over the line $L_2$. The purpose of shortcircuiting the induction coil connecting the output circuit of amplifier $A_4$ with line $L_4$, is to thereby prevent the passage over line $L_4$ and to station C of any of the ringing current originally transmitted over lines $L_1$ and $L_2$, which due to any unbalance in artificial line N' might tend to leak back over line $L_3$.

The ringing current transmitted over the line $L_2$ at station E operates a ringing responsive relay 9 in bridge of the input circuit of the four wire repeater. The action of relay 9 breaks the circuit through the normally energized relay 56 which thus allows its armature to retract and close a circuit through relay 10. The energization of relay 10 connects a local source of 16 cycle ringing current to the contacts of jack J', whereby it is applied to the terminating two wire line.

Similarly in order to provide for through ringing from station E to station C a relay 11 responsive to 16 cycle ringing current is bridged across the output circuit 12 of the four wire repeater at station E, the action of said relay controlling the operation of relay 58 which when energized applies a local source of 133 cycle ringing current to the transformer 42 and thus to line $L_3$. The ringing current transmitted over the line $L_3$ to station D operates a ringing responsive relay 14 at said station which in a manner similar to that of relay 7 opens the shunt portion of potentiometer 15 and shortcircuits the induction coil 25 connecting line $L_2$ to the output circuit of amplifier $A_2$. The ringing current from line $L_3$ is then amplified by amplifiers $A_3$ and $A_4$ and transmitted over the line $L_4$ to station C where it actuates a relay 16 to control, in a manner similar to relay 9, the application of 16 cycle ringing current to the terminating two wire line, over the contacts of relay 17.

In order to test the apparatus already described in Figs. 1 and 2 the apparatus illustrated in Fig. 3 is provided. In Fig. 3 are shown two plugs $P_3$ and $P_4$ which are inserted in jacks $J_1$ and $J_2$ respectively when it is desired to test the amplifiers $A_1$ and $A_2$ of station D, and, when amplifiers $A_3$ and $A_4$ are to be tested, are inserted in jacks $J_3$ and $J_4$ respectively as has been formerly pointed out. Connected to plugs $P_3$ and $P_4$ by means of conductors 94 and 96 are shown two networks $N_3$ and $N_4$ adapted to simulate a given length of line adopted as a standard for comparison. A key K is shown which when thrown to the left connects a tone source 93 to plug $P_3$, and when thrown to the right serves to actuate mechanisms generating 133 cycle ringing current and to apply such current to conductors 94 and to plug $P_3$. In case it is found desirable to substitute an ordinary telephone transmitter in place of the tone source 93, plug $P_7$ is provided to coöperate with jack $J_7$. The insertion of plug $P_7$ into jack $J_7$ serves to shortcircuit relay 92 which controls the tone source and connect the transmitter conductors 106 directly through key K to conductors 94 and plug $P_3$. Connected normally to plug $P_4$ and conductors 96 is a receiver 82 and a receiver shunt 81 consisting of a series resistance 101 and a shunt resistance 100. The receiver shunt 81 is adjustable and is fitted with a scale (not shown) graduated to indicate transmission gain in terms of some suitable unit. A repeater cutout key $K_1$ is provided, which serves to actuate relays 86 and 87 which disconnect the repeater set and directly connect circuits 94 and 96 by means of conductors 95.

When plugs $P_3$ and $P_4$ are inserted in jacks $J_3$ and $J_4$ or jacks $J_1$ and $J_2$ the repeater set is cut out of service from the transmission lines and transmission takes place directly over the auxiliary conductors 70, 71 or 72, 73, as has been formally pointed out. This disconnecting of the repeater set also serves to open the aforementioned simplex circuit whereby the amplifiers may be caused to operate under control of the terminal operators. In order to render the amplifiers operative, either for testing purposes or for actual service, jacks $J_5$ and $J_6$ are provided as shown in Figs. 1 and 2, and upon inserting an idle plug in either of these jacks the simplex circuit though controlling relay 3 is broken and a relay 160 is energized to close the circuit of the filaments thereby rendering the amplifiers operative.

To test the amplifiers $A_3$ and $A_4$ with respect to the transmission of speech, key K is thrown to the left and key $K_1$ is operated. Current variations arising in tone source 93 are then transmitted to receiver 82 over conductors 95. The key $K_1$ is now released. Current variations from tone source 93 are then transmitted to the receiver 82 through the receiver shunt 81 by way of the amplifiers $A_3$ and $A_4$. By now adjusting the receiver shunt 81 so that the same volume of sound will be heard in receiver 82 both when the current variations pass through the amplifiers and when the amplifiers are disconnected by key $K_1$, the gain in transmission due to the amplifiers may be observed on the scale with which the receiver shunt is fitted.

If it is desired to test the amplifiers $A_3$ and $A_4$ with respect to their amplification of ringing current, key K is thrown to the right. This opens the circuit of signal lamp 105 and also starts into operation the mechanism 88 whereby 133 cycle ringing current is applied to the amplifiers $A_3$ and $A_4$ through plug $P_3$. In being transmitted to the amplifiers the ringing current operates ringing responsive relay 14 which there upon actuates means to connect the circuit 97, leading from the ringing responsive relay 91 to the circuit 96 leading to plug $P_4$. The ringing current after passing through the amplifiers to plug $P_4$ will then operate relay 91. This will close a circuit through the signal lamp 105 and cause it to glow, indicating that the repeater is functioning properly with respect to ringing current.

With this brief description of the apparatus in mind, the invention may now be fully understood from a description of the operation. To test the amplifiers $A_3$ and $A_4$ with respect to transmission of speech the key K is thrown to the left. This closes a circuit from ground 114, upper left hand contact of key K, conductor 115, winding of relay 92, to grounded battery 116. This energizes relay 92 which starts into operation the tone source 93 from which current variations are originated. These current variations are transmitted through transformer 117 over conductors 98, contacts of key K, through the net-work $N_3$ and over conductors 94 to terminals of plug $P_3$, contacts of jack $J_3$ and through the primary winding of transformer 43, thus completing the circuit. By means of transformers 43 and 44 the current variations are transmitted through the amplifiers $A_3$ and $A_4$ and by means of transformer 45 are transmitted to contacts of jack $J_4$ and terminals of plug $P_4$. Thence the current variations are transmitted over conductors 96, through net-work $N_4$, over conductors 118 and through receiver shunt 81 to receiver 82.

When the key $K_1$ is operated a circuit is closed from ground, contact of key $K_1$, over conductor 119, through winding of relay 87 to battery and ground and also over conductor 119, through winding of relay 86 to battery and ground. The energization of relays 87 and 86 serves to disconnect conductors 96 from the terminals of plug $P_4$ and disconnect conductors 94 from the terminals of plug $P_3$ and at the same time connect conductors 94 and 96 by means of conductors 95. The operation of key $K_1$ also closes a circuit from ground, contact of key $K_1$, conductors 119 and 120, winding of relay 83 to battery and ground. The energization of relay 83 serves to shortcircuit the series resistance 101 and to open the circuit of the shunt resistance 100 of receiver shunt 81. It will now be seen that when the key $K_1$ is operated the current variations which originated in tone source 93 and were transmitted over conductors 94 will now pass from thence over conductors 95 and 96, through net-work $N_4$, conductors 118 to receiver 82. By now adjusting the receiver shunt 81 until the same sound is heard in receiver 82 both when the repeater and receiver shunt are in circuit and when they are disconnected the gain in transmission due to the amplifiers $A_3$ and $A_4$ may now be observed on the scale of the receiver shunt.

When the key K is thrown to the right to test amplifiers $A_3$ and $A_4$ with respect to ringing current the following circuit is closed, from ground 114, contact 130 of key K, conductor 107, winding of relay 85, to battery and ground. Also the following circuit is closed, from ground 114, contact 130 of key K, conductor 107, armature and contact of relay 91, conductor 108 through the winding of relay 90 to battery and ground, also from the contact of relay 91, over conductor 108, through the winding of relay 89 to battery and ground. The closing of the above described circuits causes relays 85, 89 and 90 to become energized. The energization of relay 85 causes it to attract its armatures and so open the closed circuits 102 and 103 which are in bridge of the mid-points of the net-works $N_3$ and $N_4$. This serves to adjust the impedance of the net-works $N_3$ and $N_4$ to a value equal to or greater than that of a line of the highest impedance to ringing currents met with under practical conditions. The energization of relay 89 causes it to pull up its armatures, the right hand armature causing it to remain locked up as long as the key K remains thrown to the right, as a circuit is closed from ground 114, contact of key K, conductor 107, right hand armature and contact of relay 89, winding of relay 89, to battery and ground. By pulling up its left hand armature relay 89 actuates the mechanism 88 which consists of a buzzer arranged so as to translate ringing current of 16 cycle frequency into a current having a frequency of 133 cycles. A ringing current of 133 cycle frequency is then transmitted through transformer 113, contacts of key K, through net-work $N_3$, along conductors 94 to the terminals of plug $P_3$, contacts of jack $J_3$, through the primary winding of transformer 43, thus completing the circuit. The energization of relay 90 causes it to attract its armature to hold open the circuit of signal lamp 105. The ringing current originated by mechanism 88 and transmitted through the primary winding of transformer 43, now sets up ringing current in the secondary winding of transformer 43 and causes ringing responsive relay 14 to become energized to pull up its armature to break the normally closed circuit through the relay 110. The deënergization of relay 110 causes its armature to retract and close a circuit from ground, armature and contact of relay 110, conductor 111, sleeve contacts of jack $J_3$ and plug $P_3$, conductor 112, through winding of relay 84 to battery and ground. This energizes relay 84 and thus connects the ringing responsive relay 91 through the conductors 97 directly to the conductors leading to the net-work $N_4$. The deënergization of relay 110 also causes its armature to retract and close a circuit through relay 61 thus causing it to become energized. The energization of relay 61 causes it to pull up its armatures, the lower armature opening the circuit of the shunt portion of potentiometer 15 in bridge across the input circuit of amplifiers $A_4$ and $A_3$. The opening of the shunt portion of potentiometer 15 by the action of relay 61 increases the amplification of amplifiers $A_3$ and $A_4$ so that the ringing current passing through transformer 44 to the amplifiers $A_3$ and $A_4$ is amplified and transmitted through transformer 45 to contacts of jack $J_4$ and plug $P_4$, over conductors 96, through net-work $N_4$, contacts and armatures of relay 84, conductors 97, and so through relay 91 completing the circuit. The energization of relay 91 causes its armature to open the circuit originally closed through relay 90 by the throwing of key K. This deënergization of relay 90 allows its armature to retract and again close the circuit through signal lamp 105 as follows: from grounded battery, through lamp 105, armature and contact of relay 90, conductors 104 and 112, sleeve contacts of plug $P_3$ and jack $J_3$, conductor 111, contact and armature of relay 110 to ground. Thus the signal lamp will be caused to glow indicating that the amplifiers $A_3$ and $A_4$ are functioning properly with respect to ringing current.

If it is desired to test the amplifiers $A_1$ and $A_2$ with respect to their operation either with telephonic or ringing currents, plug $P_3$ is inserted in jack $J_1$ and plug $P_4$ is inserted in jack $J_2$. The operation of the testing and repeater sets is then substantially the same as when amplifiers $A_3$ and $A_4$ are tested and accordingly will not be described.

While the invention has been disclosed as embodied in certain forms which are considered desirable, it will be understood that it may be embodied in many widely different organizations without departing from the spirit of the invention.

What is claimed is:

1. A testing system comprising a transmission circuit, said circuit comprising two terminal stations interconnected by transmission lines in which are inserted amplifying means to be tested, a testing apparatus, a source of current variations therefor and indicating means, means to connect the testing apparatus to the means to be tested, an auxiliary path in said testing apparatus and means whereby the current variations may be passed either through the apparatus to be tested to the indicating means, or over said auxiliary path in said testing apparatus to the indicating means.

2. A testing system comprising a transmission circuit, said circuit comprising two terminal stations interconnected by transmission lines in which are included amplifying means, means at said terminal stations to control the operation of said amplifying means, a testing apparatus, means for connecting said testing apparatus to the amplifying means, said connecting means being operative to break the control over said amplifying means from the terminal stations, and auxiliary means associated with said amplifying means to control the operation thereof.

3. In a testing system, a circuit to be tested, amplifying means and means responsive to ringing current associated with said circuit, means under the control of said ringing responsive means for varying the amplification of said amplifying means, a testing apparatus comprising a source of ringing current and indicating means responsive to outgoing ringing current from said tested circuit, and means for associating said testing apparatus with said circuit whereby upon the response of the ringing responsive means to current from said source said indicating means will be operated.

4. In a testing system, a circuit to be tested, amplifying means and a relay responsive to ringing current associated with said circuit, means under the control of said relay for so increasing the amplification of said amplifying means that said means will amplify ringing current, a testing apparatus comprising a source of ringing current and indicating means responsive to outgoing ringing current from said circuit to be tested, and means for associating said testing apparatus with said circuit whereby upon the response of said relay to current from said source said indicating means will be operated.

5. In a testing system, a circuit to be tested, a relay responsive to ringing current associated with said circuit, a testing apparatus comprising a source of ringing current, means to apply said ringing current to the circuit to be tested, means in said circuit to be tested to amplify said ringing current, indicating means responsive to amplified ringing current from a tested circuit, and means under control of said ringing responsive relay to connect said indicating means to the output circuit of the tested circuit.

6. The combination with a circuit to be tested; of a testing apparatus comprising an outgoing circuit, a source of current for said circuit, an incoming circuit, indicating means associated with said incoming circuit, auxiliary conductors and means to interconnect said outgoing circuit to said incoming circuit over said auxiliary conductors.

7. The combination with a circuit to be tested; of a testing apparatus comprising an outgoing circuit, a source of current for said circuit, an incoming circuit, a receiver and a receiver shunt associated with said incoming circuit, auxiliary conductors, and means to interconnect said outgoing circuit and said incoming circuit over said auxiliary conductors, said means operating to disconnect said receiver shunt.

8. A testing apparatus comprising an outgoing circuit, a net-work in said circuit adapted to simulate a transmission line, a source of current for said circuit, an incoming circuit, a net-work in said circuit similar to said first mentioned net-work, a receiver and a receiver shunt associated with said incoming circuit, auxiliary conductors, a controlling key to interconnect said outgoing circuit and said incoming circuit over said auxiliary conductors, means under the control of said key to disconnect said receiver shunt.

9. A testing system comprising a transmission circuit, said circuit comprising two terminal stations interconnected by two transmission lines in which are included amplifying means, each transmission line being used for transmission in one direction only, a testing apparatus, means to connect said testing apparatus to either of said amplifying means without affecting the operation of said transmission circuit with respect to said other amplifying means.

10. A testing system comprising a transmission circuit, said circuit comprising two terminal stations interconnected by a pair of transmission lines in which are included amplifiers, each transmission line being used for transmission in one direction only, auxiliary conductors adapted to be bridged around said amplifiers, a testing apparatus, and means to connect said testing apparatus to the amplifier in either transmission line, said means operating to disconnect said amplifier from said transmission line and to complete said line over its auxiliary conductors, whereby when said testing apparatus is connected to one of said amplifiers, transmission may take place over said transmission circuit.

In testimony whereof, I have signed my name to this specification this ninth day of October 1917.

JOHN F. TOOMEY.